United States Patent [19]

Dobrez et al.

[11] Patent Number: 5,531,905
[45] Date of Patent: * Jul. 2, 1996

[54] SYSTEM AND METHOD TO CONTROL LAUNDRY WASTE WATER TREATMENT

[75] Inventors: John G. Dobrez, Flossmoor; Frank T. Prendergast, Woodridge, both of Ill.

[73] Assignee: Dober Chemical Corporation, Midlothian, Ill.

[*] Notice: The term of this patent shall not extend beyond the expiration date of Pat. No. 5,160,439.

[21] Appl. No.: 349,554

[22] Filed: Dec. 2, 1994

[51] Int. Cl.$^6$ .................. B01D 21/32; B01D 21/01
[52] U.S. Cl. .................. 210/709; 210/96.1; 210/198.1; 210/746
[58] Field of Search .................. 210/85, 94, 96.1, 210/103, 198.1, 708, 709, 739, 745, 746; 324/143, 453

[56] References Cited

U.S. PATENT DOCUMENTS

| | | | |
|---|---|---|---|
| 3,350,301 | 10/1967 | Hoffman | 210/708 |
| 3,399,133 | 8/1968 | Gerdes et al. | 210/709 |
| 3,526,827 | 9/1970 | Cardwell . | |
| 3,595,393 | 7/1971 | Messa | 210/103 |
| 3,605,775 | 9/1971 | Zaander et al. | 210/745 |
| 3,673,065 | 6/1972 | Anderson | 210/708 |
| 3,725,263 | 4/1973 | Harris et al. . | |
| 3,951,795 | 4/1976 | Doncer et al. . | |
| 4,219,417 | 8/1980 | Ramirez . | |
| 4,855,061 | 8/1989 | Martin | 210/709 |
| 4,882,069 | 11/1989 | Pohoreski | 210/713 |
| 5,160,439 | 11/1992 | Dobrez et al. | 210/709 |
| 5,167,829 | 12/1992 | Diamond et al. | 210/708 |
| 5,200,086 | 4/1993 | Shah et al. | 210/708 |
| 5,246,590 | 9/1993 | Dobrez et al. | 210/96.1 |
| 5,382,356 | 1/1995 | Thogho et al. | 210/746 |

FOREIGN PATENT DOCUMENTS

| | | |
|---|---|---|
| 2432482 | 4/1980 | France . |
| 3344275 | 6/1985 | Germany . |

OTHER PUBLICATIONS

"An On–Line Monitor for Flocculation Control", Brown et al, pp. 239–245, Undated.

Primary Examiner—Joseph W. Drodge
Attorney, Agent, or Firm—Frank J. Uxa

[57] ABSTRACT

A system and method are disclosed for controlling the amount of cationic coagulant to be introduced into a laundry waste water having a content of non-solid fats, oils and/or grease (FOG) which is to be reduced. This system comprises a detector, located upstream from the introduction of cationic coagulant and upstream of the reduction of FOG level, adapted to determine the electric charge value of a material comprising the laundry waste water having a non-solid FOG level which is to be reduced, and being substantially free of cationic coagulant, and to provide a signal indicative of this electric charge value and an automatic processor provided with a relationship of the amount of cationic coagulant to be introduced into the material to reduce the non-solid FOG level to a given level as a function of the signal, and adapted to receive the signal and to provide a control signal to a source of cationic coagulant to control the amount of cationic coagulant introduced from the source of cationic coagulant into the material.

14 Claims, 2 Drawing Sheets

SYSTEM AND METHOD TO CONTROL LAUNDRY WASTE WATER TREATMENT

BACKGROUND OF THE INVENTION

The present invention relates to systems and methods for controlling the amount of cationic coagulant to be introduced into laundry waste water having a content of non-solid fats, oils, and/or grease which is to be reduced.

Laundry waste waters include or become contaminated with one or more fats and/or oils and/or grease. As used herein, the term "FOG" refers to fats and/or oils and/or grease. The FOG content is often present in laundry waste waters in non-solid form, for example, in a liquid emulsified form, such as the discontinuous phase in an aqueous emulsion. For example, the water utilized in a conventional laundry operation becomes contaminated with non-solid FOG, for example, from the articles which are laundered and/or from the detergents and other additives used in the operation. This laundry waste water often cannot be disposed of directly into a publicly owned treatment works because of the relatively high non-solid FOG concentration.

One approach to overcoming this problem has been to add a coagulant, for example, a cationic coagulant such as one or more cationic polymers and the like, to the laundry waste water so as to coagulate and separate at least a portion of the FOG from the laundry waste water. These coagulated materials are separated from the remainder of the laundry waste water and disposed of, for example, as a sludge in a land fill or other suitable disposal facility. The resulting laundry waste water has a sufficiently reduced non-solid FOG concentration to be conveniently disposed of in a publicly owned treatment works.

One potential difficulty with such a treatment process is that the non-solid FOG level in the laundry waste water varies over time so that the demand for cationic coagulant also varies. In general, as the nonsolid FOG level in a laundry waste water increases, the amount of cationic coagulant needed to provide a laundry waste water product having an acceptably low non-solid FOG concentration also increases. Thus, the amount of cationic coagulant used is often set at a relatively high level to insure that the water entering the publicly owned treatment works is acceptable. The amount of coagulant used in this type of process is often in excess of that needed to provide the acceptably low FOG content.

Directly analyzing an aqueous medium for non-solid FOG is often a tedious and time consuming task which may involve taking a sample of the laundry waste water. The time involved in performing these steps may be such as to render the FOG determination obsolete in that the laundry waste water being treated may have a different level of FOG than that determined via this relatively complex procedure.

Martin U.S. Pat. No. 4,855,061 discloses a system for controlling coagulant dosage to water to remove nonsettleable solids, for example, to produce potable water. The coagulant is controlled using a charge sensing means which has a set point that is adjusted in response to the turbidity of the treated water. This patent does not disclose treating relatively heavily contaminated industrial waste waters, such as laundry waste waters, which contain non-solid contaminants, such as non-solid FOG. Also, the disclosed system relies on measuring the turbidity of the finally treated water which adds to the cost and complexity of the system.

German Patent 3,344,275 discloses a system for treating waste waters, such as laundry waste waters, which include non-solid contaminants, for example, non-solid FOG. Various parameters of the raw waste water are measured. Downstream of these measurements, treatment chemicals are added to the waste water. Flocculent is added in response to the cloudiness measured; alkali and/or acid is added in response to the pH measured; and reducing agent is added in response to the redox potential measured. This German patent does not disclose using the electric charge value of the raw waste water to control flocculent addition. The turbidity of the raw waste water may not provide an accurate indication of the amount of flocculent needed. For example, the non-solid FOG may, at this point, be dissolved in the water or be of such small size as to not contribute to turbidity. Thus, ineffective or insufficient flocculent dosing may occur.

Dobrez et al U.S. Pat. 5,246,590 discloses measuring the electric charge of a combination of laundry waste water and cationic coagulant downstream from the introduction of the cationic coagulant. This measured value is used to control the amount of coagulant added. While the systems and methods disclosed in this patent are very effective in controlling the amount of cationic coagulant used, certain concerns remain. For example, since the electric charge value is measured after cationic coagulant is added, the partially coagulated mixture contacting the probe of the electric charge detector has a tendency to foul or dirty the probe with the coagulated solids. This can result in unreliable and inconsistent measurements and control, and may require relatively frequent cleaning of the probe, during which the control system is not operating. In addition, changes in the amount of coagulant added occur reactively, that is after the mixture being measured includes all the coagulant it will ever have. No additional coagulant is introduced into (and no coagulant can be withdrawn from) this mixture as a result of these measurements. In this sense, such control systems are not optimally effective.

SUMMARY OF THE INVENTION

New systems and methods for controlling the amount of cationic coagulant composition to be introduced into a laundry waste water having a non-solid FOG concentration which is to be reduced have been discovered. The present systems and methods provide a very effective, in terms of time and cost, way to control the amount of cationic coagulant used to reduce the non-solid FOG level in a laundry waste water. In addition, the control is based on measurements performed in non-solid FOG-containing laundry waste water, preferably in the substantial absence of cationic coagulant, so that the measuring probe or device is not subject to becoming dirtied or soiled by coagulated (solid) FOG material. Further, the control measurements are performed on non-solid FOG-containing laundry waste water which is yet to be treated with cationic coagulant. Thus, the control measurements are effectively used to control the treatment of the waste water from which the control measurements are taken. Such a "proactive" control approach is more optimally effective than is the reactive scheme described in the prior art.

In one broad aspect, the present system comprises a detector adapted to determine the electric charge value of a material comprising, preferably consisting of, a laundry waste water having a non-solid FOG level and being substantially free of cationic coagulant and to provide a signal indicative of this electric charge value. This detector is preferably located upstream of the introduction of cationic coagulant and upstream of the reduction of FOG level. An automatic processor, preferably an electronic microprocessor, is included. This automatic processor is provided with a relationship, preferably an empirical relationship which is experimentally determined, of the amount of cationic coagulant composition to be introduced into the material to reduce the FOG level of the material to a given level as a function of this signal. The automatic processor is adapted to receive the signal from the detector and to provide a control signal to a source of cationic coagulant, for example, including a cationic coagulant pump and a cationic coagulant supply tank, to control the amount of cationic coagulant introduced from the source of cationic coagulant into the material, e.g., laundry waste water, having a non-solid FOG level.

Methods for controlling the amount of cationic coagulant to be introduced into a laundry waste water having a non-solid FOG level, for example, using the present systems, are disclosed and are within the scope of the present invention.

These and other aspects and advantages of the present invention are set forth in the following detailed description and claims, particularly when considered in conjunction with the accompanying drawings in which like parts bear like reference numerals.

DETAILED DESCRIPTION OF THE DRAWINGS

Figure 1:
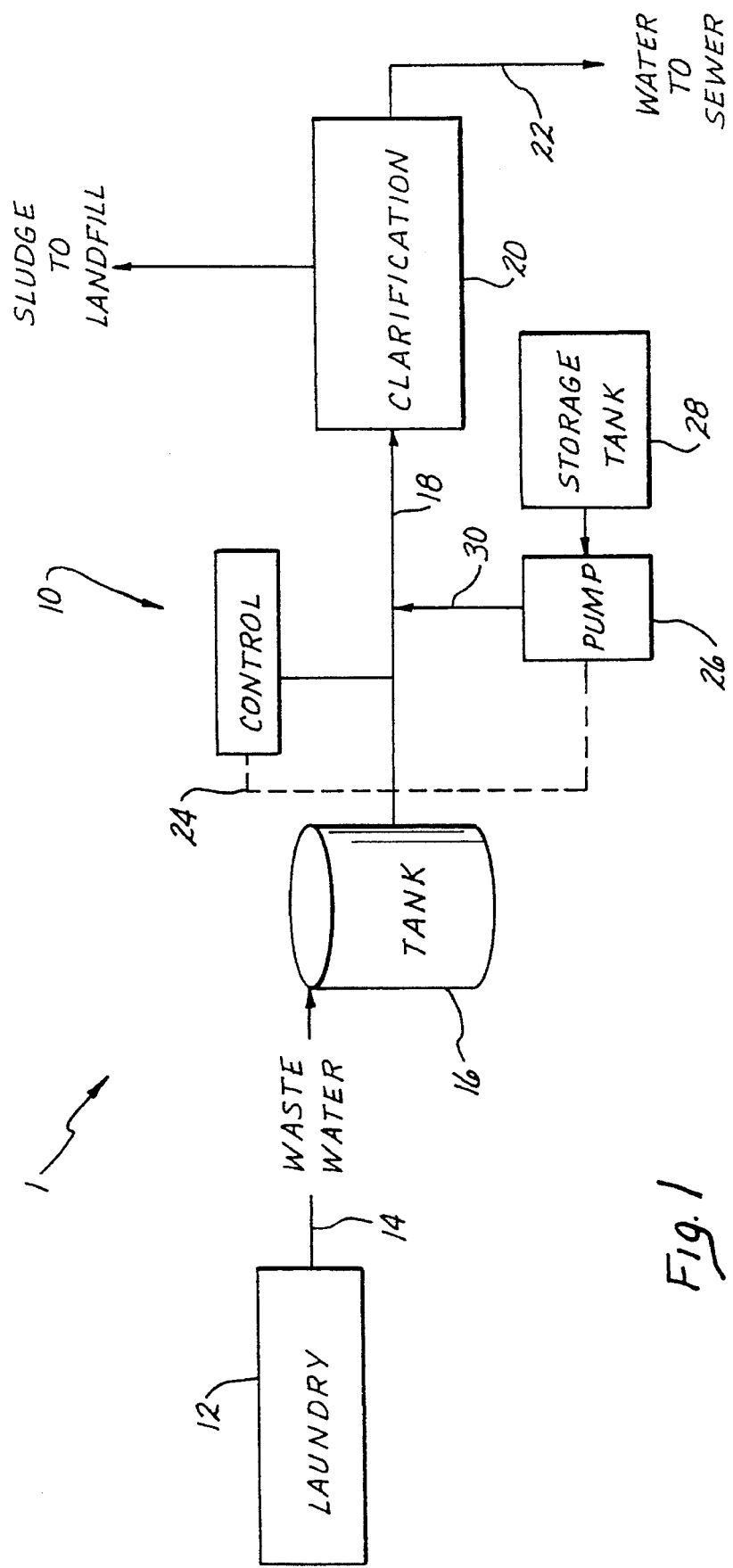
FIG. 1 is a schematic illustration showing one laundry waste water treatment installation using an embodiment of the present control system.

FIG. 1 illustrates a laundry waste water treatment installation, shown generally at 1, in which is utilized an embodiment of the present control system, shown generally at 10. Waste water from laundry 12, which contains a substantial amount of non-solid fats, oils and grease (FOG), is passed through line 14 to an intermediate storage tank 16. The non-solid FOG content or level in this waste water is from the articles which were laundered in laundry 12, as well as from the detergents and other additives used by laundry 12. In any event, the FOG level of the waste water must be reduced before the water stream can be disposed of in a publicly owned treatment (water treatment) works. It should be noted that the water stream produced from installation 1 is ordinarily not potable water, in particular has reduced quality relative to potable water. Thus, relatively heavily contaminated laundry waste water is made more suitable for convenient disposal, not for use as potable water.

To coagulate the non-solid FOG in the waste water, a liquid cationic coagulant composition, such as that sold by Dober Chemical Corporation under the Trademark DWT 5222, is added to the waste water exiting intermediate tank 16 and passing through line 18. After the coagulant has been added, the mixed waste water/coagulant is passed to a clarification section 20 where coagulated FOG-containing material is separated from the remainder of the laundry waste water. This coagulated FOG-containing material is removed from the clarification section 20 and passed, as a sludge, to a landfill operation or other suitable disposal facility. The clarified remainder of the laundry waste water is passed through line 22 to a publicly owned treatment works.

One important variable in determining the amount of coagulant to be used to treat the laundry waste water is the non-solid FOG level in the waste water. In general, the higher the non-solid FOG level, the more coagulant that is needed to reduce the non-solid FOG level of the clarified remainder of the laundry waste to an acceptable level, that is a non-solid FOG level acceptable so that the clarified remainder of the laundry waste water in line 22 can be passed to a publicly owned treatment works.

The present control system 10 provides for determining or monitoring the electric charge value of the laundry waste water in line 18 which is substantially free of cationic coagulant. The point or points along line 18 where the laundry waste water flowing in line 18 is monitored are located upstream of the location at which the coagulant is introduced into line 18. The non-solid FOG level of this laundry waste water is not determined or monitored. In fact, the electric charge value determined by control system 10 preferably can be determined without taking individual samples from line 18, for example, to a remote location. Determining the electric charge value of the non-solid FOG-containing laundry waste water, which preferably includes substantially no solid phase, upstream of cationic coagulant introduction avoids contacting the probe of the detector with coagulated FOG material which can dirty or soil the probe. Thus, the probe remains clean for longer periods of time so that more reliable and consistent control is obtained and control system downtime for probe cleaning is reduced.

Based on the electric charge value determination, control system 10 provides a control signal through line 24 to coagulant pump 26 which is operated in response to the control signal in line 24. Based upon this control signal, coagulant pump 26 passes a variable amount of coagulant from coagulant storage tank 28 through line 30 into line 18.

The amount of coagulant entering line 18 is DB-22 8 controlled so that the clarified remainder of laundry waste water in line 22 is such as to be acceptable for disposal in a publicly owned treatment works. The amount of coagulant is controlled so that no substantial or undue excess of coagulant is used to achieve an "acceptable" stream in line 22. In other words, control system 10 controls the amount of coagulant introduced into line 18 so that "acceptable" clarified remainder of laundry waste water is produced in line 22 while substantially minimizing the actual amount of coagulant used. In addition, the "proactive" character of the present control approach allows the same non-solid FOG-containing laundry waste water the electric charge of which is determined (upstream of the introduction of cationic coagulant) to be treated with the proper amount of cationic coagulant based on the electric charge value determined. This control approach is more optimally effective in treating all the laundry waste relative to the reactive control schemes of the prior art.

Each of the lines which transmit signals are shown in shadow. The present signals are preferably electrical or electronic in nature, although one or more other types of signals may be employed.

Figure 2:
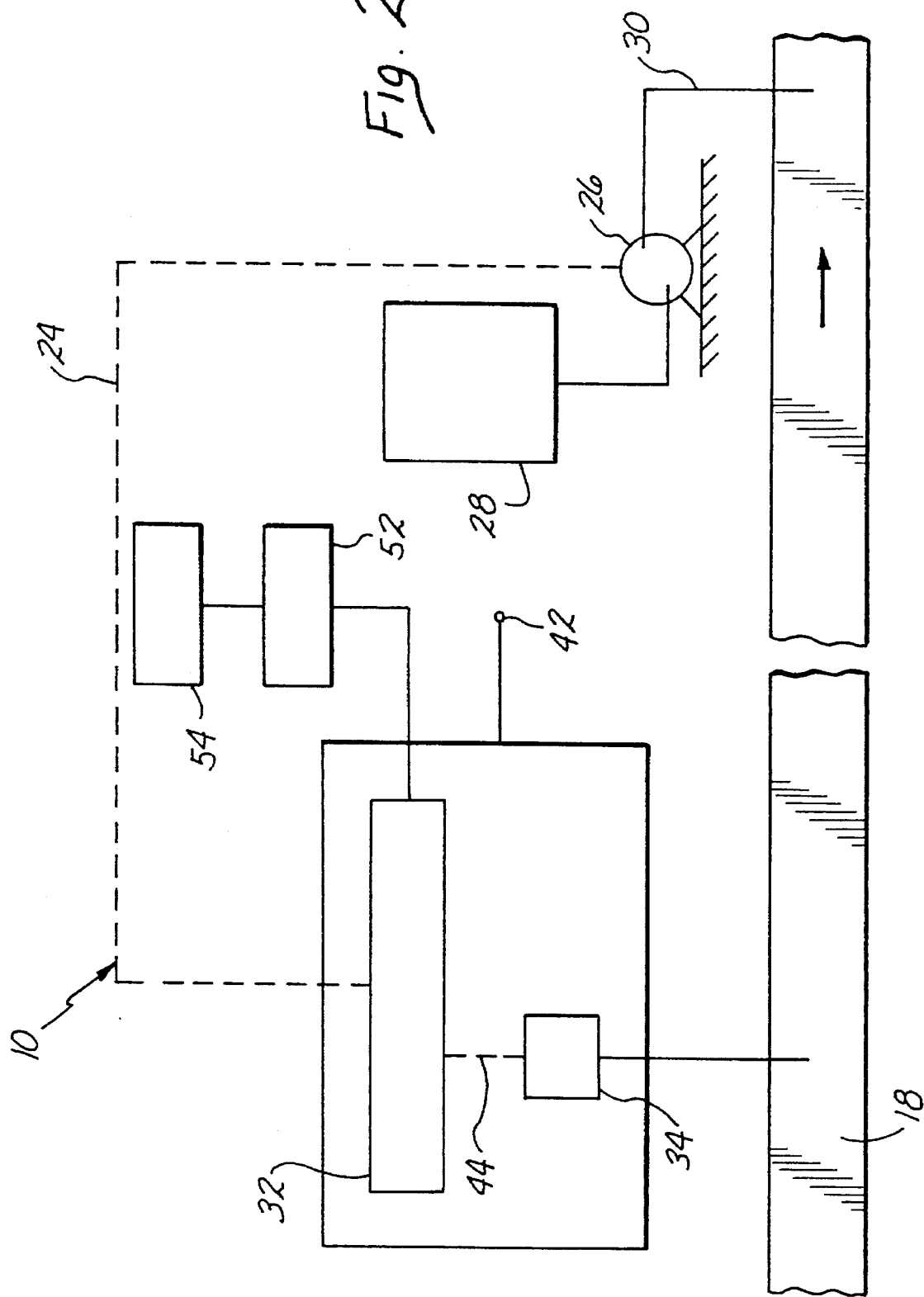
FIG. 2 is a detailed schematic illustration of the embodiment of the present control system used in FIG. 1.

Referring now to FIG. 2, control system 10 is shown in more detail. Control system 10 includes an electronic microprocessor 32 and a streaming current detector 34. Any suitable streaming current detector 34 may be used in control system 10 provided that such components are capable of transmitting a signal, e.g., an electrical or electronic signal, to electronic microprocessor 32. Each of these system components may be chosen from devices which are conventional and well known in the art. For example, useful electronic microprocessors include, but are not limited to, microprocessors sold by Allen Bradley under the trademark SLC-500, and the Series 9 microprocessors sold by General Electric; and useful streaming current detectors include, but are not limited to, those sold by Chemtrac, and such detectors sold by Milton Roy under the trademark SCD-2200.

Certain "combination" streaming current detectors/processors, such as that sold by Milton Roy under the trademark SCD-5200 may be utilized provided that they are modified to effectively measure the electric charge value of a non-solid FOG-containing laundry waste water which is substantially free of cationic coagulant. In general, such modifications include the addition of a signal processor that combines a feed forward bias signal with the output signal of the instrument, for example, the SCD-5200 instrument. The feed forward bias signal is empirically or experimentally determined and represents an amount of coagulant to be included in the waste water in addition to the amount of coagulant represented by the instrument output signal. The feed forward bias signal is effective to maintain satisfactory operation of the streaming current detector, for example, the SCD-5200 streaming current detector, in accordance with the present invention.

Coagulant pump 26 may be any suitable pump capable of delivering the required amount of coagulant from storage tank 29 to line 18. Coagulant pump 26 is preferably a variable flow device, that is a device which is capable of delivering a controlled, variable amount of coagulant to line 18 in response to a control signal in line 24 from electronic microprocessor 32. Examples of pumps which may be used include, but are not limited to, electromagnetic pumps, such as the chemical metering pumps sold by Liquid Metronics, Inc. under the trademark LMI Series C.

The streaming current detector 34 measures the electric charge of the non-solid FOG-containing laundry waste water substantially free of cationic coagulant flowing through line 18. The streaming current detector 34 includes a probe conduit or similar device which is passed into line 18 so that a determination of the electric charge value can be made while the non-solid FOG-containing laundry waste water is flowing through line 18. A minor amount of the FOG-containing laundry waste water substantially free of cationic coagulant in line 18 may be temporarily pumped, e.g., through this probe conduit, into the portion of the detector 34 located outside line 18 in order to determine the electric charge value. This minor amount of the laundry waste water is returned, e.g., through the probe conduit, to line 18. No samples of this laundry waste water are required to be permanently removed from line 18, for example, to a remote location, to make these determinations. Preferably, the streaming current detector 34 measures the electric charge value of the nonsolid FOG-containing laundry waste water in line 18 on a substantially continuous basis so that electronic microprocessor 32 is provided with a signal indicative of the current conditions in line 18.

A conventional electrical power source 42 is used to power each of the components 32 and 34 of control system 10.

Once the electric charge value determination is made, a signal in line 44 is provided from the streaming current detector 34 to electronic microprocessor 32 which receives the signal and processes the signal, as described below.

Over a period of time, for example, over a two to three week period, during which the overall waste water system 1 is operated without using a control signal from line 24 (for example, using manual control of coagulant pump 26), a relationship is developed between the value of the electric charge values determined by streaming current detector 34 and the amount of cationic coagulant needed to be introduced into line 18 to provide a clarified remainder of the laundry waste water in line 22 which is acceptable to be treated in a publicly owned water treatment works. This relationship may comprise one or more algorithms which, overall, define the amount of coagulant needed to provide an acceptable laundry waste water product in line 22 as a function of the electric charge value determined by streaming current detector 34 or as a function of the signal from line 44.

Such experimentally developed, empirical relationship is manually provided to electronic microprocessor 32 through keyboard 52, for example, an operator interface sold by Spectrum under the trademark SOE 201. Electronic microprocessor 32 is programmed, for example, through keyboard 52 using conventional and well known computer software programming techniques, to process the signal from line 44 in accordance with the above-noted relationship and provide a control signal through line 24 to coagulant pump 26 to control the flow of cationic coagulant into line 18. Thus, electronic microprocessor 32 receives the signal from line 44, appropriately uses the value of this signal in the above-noted relationship, computes a value for the control signal, and passes this control signal through line 24 to coagulant pump 26. For example, electronic microprocessor 32 using the above-noted relationship and the signal received from line 44, determines whether more, less or the same amount of coagulant is to be introduced into line 18 to obtain an acceptable remainder of the laundry waste water in line 22. Based on this determination, electronic microprocessor 32 generates and sends a control signal through line 24 to coagulant pump 26 causing the coagulant pump to introduce more, less or the same amount of cationic coagulant into line 18. Since this control process is at least periodically, preferably continuously, repeated, the amount of coagulant introduced into line 18 is effectively controlled so as to obtain an acceptable remainder of the laundry waste water in line 22, without using an unduly excessive amount of coagulant.

The correctness of the information provided via keyboard 52 is visually monitored using a monitor 54 which is connected with keyboard 52. Although electronic microprocessor 32, keyboard 52 and monitor 54 are shown as separate components, they may be provided as a single, integral unit.

The relationship between the determined electric charge value of the non-solid FOG-containing laundry waste water free of cationic coagulant and the effective amount of coagulant to be used depends on a number of factors, many of which are site specific, for example, the composition of the waste water, equipment sizes, lengths and diameters of pipes between pieces of equipment, placement of control system 10 and the like. Thus, the actual relationship used for control purposes is preferably developed at and for the site where it is to be used. Although the control relationship may vary from site to site, it is often, though not always, true that the amount of coagulant needed to achieve a remainder of the laundry waste water which is acceptable for disposal to a publicly owned treatment works increases as the electric charge non-solid FOG-containing laundry waste water free of cationic coagulant increases.

After the initial period of time during which the above-noted relationship is developed, the control system 10 operates substantially automatically, i.e., without human intervention, and can be operated on a continuous, on-line basis to control the treatment of the waste water from laundry 12.

Based on the electric charge value determined by streaming current detector 34 and the relationship between the electric charge value and the amount of cationic coagulant needed to be introduced into line 18 to produce an acceptable laundry waste water product in line 22, electronic microprocessor 32 transmits a control signal through line 24 to coagulant pump 26 which operates in response to this control signal to provide a controlled amount of cationic coagulant from storage tank 28 via line 30 into line 18.

The operation of the control system 10 is illustrated by the following, non-limiting example.

For a two week period of time, coagulant pump 26 is operated manually to provide a suitable amount of cationic coagulant to produce an acceptable clarified remainder of the laundry waste water in line 22. During this period of time, the values of the electric charge value of the nonsolid FOG-containing laundry waste water free of cationic coagulant in line 18 determined by streaming current detector 34 are periodically noted along with the cationic coagulant flowrate at the time these value are determined. Also, during this period of time, the flowrate of cationic coagulant provided to line 18 and/or the composition and/or flowrate of the non-solid FOG-containing laundry waste water free of cationic coagulant in line 18 are varied over relatively wide ranges to aid in developing a coagulant flowrate/electric charge value relationship having relatively broad applicability. The resulting data are then correlated, for example, using conventional and well known data correlation techniques, to yield the relationship which is manually imputed through keyboard 52 into electronic microprocessor 32.

The laundry waste water treatment system 1 is then controlled by control system 10. Thus, if the electric change value measured by streaming current detector 34 indicates that more cationic coagulant is needed, electronic microprocessor 32 will send a control signal through line 24 instructing pump 26 to supply more cationic coagulant to line 18. Conversely, if the electric charge value measured by streaming current detector 34 indicates that less or the same amount of cationic coagulant is needed, electronic microprocessor 32 will send a control signal through line 24 instructing pump 26 to supply less or the same amount, respectively, of cationic coagulant to line 18.

This on-line control mechanism is very effective in providing a clarified remainder of the laundry waste water in line 22 which is acceptable for transport to a publicly owned treatment works. In addition, the present control system 10 is very effective in controlling the amount of cationic coagulant used so that the costs of providing this acceptable remainder of the laundry waste water is controlled, and preferably minimized. The present system is very effective and useful with only the electric charge value of the non-solid FOG-containing laundry waste water free of cationic coagulant being used to control cationic coagulant addition. The amount or flowrate of the laundry waste water being treated need not be monitored. Further, the probe of the electric charge detector remains more clean and requires less frequent cleanings (reduced control system downtime) to obtain reliable and consistent electric charge values, for example, on a continuous basis. Moreover, the present "proactive" control approach is more optimally effective than the previous reactive control schemes. Control system 10 is responsive to changes in the composition of the laundry waste water from laundry 12 so that the amount of cationic coagulant can be increased or decreased depending upon the actual needs of the installation 1.

While this invention has been described with respect to various specific examples and embodiments, it is to be understood that the invention is not limited thereto and that it can be variously practiced within the scope of the following claims.

What is claimed is:

1. A system constructed and arranged for controlling the amount of cationic coagulant introduced into waste water from a laundry which waste water has a non-solid FOG level which is to be reduced, said system comprising:

a detector adapted to determine the electric charge value of a material comprising the waste water having a non-solid FOG level and being substantially free of cationic coagulant and to provide a signal indicative of said determined electric charge value, said detector being upstream of the introduction of cationic coagulant and upstream of the reduction of FOG level; and an automatic processor provided with a relationship of the amount of cationic coagulant introduced into the waste water to reduce the non-solid FOG level of the waste water to a given level as a function of only said signal, and adapted to receive said signal, to process said signal in accordance with said relationship, and to provide another signal to a source of cationic coagulant to control the amount of cationic coagulant introduced from the source of cationic coagulant into the waste water having a non-solid FOG level.

2. The system of claim 1 wherein said relationship is experimentally developed.

3. The system of claim 1 which consists essentially of said detector, said automatic processor and means to introduce cationic coagulant.

4. The system of claim 1 wherein said detector is adapted to determine the electric charge value of a material consisting of the waste water having a non-solid FOG level, said material having and substantially no solid phase.

5. The system of claim 1 wherein said detector comprises a streaming current detector.

6. The system of claim 1 wherein said automatic processor comprises a microprocessor.

7. The system of claim 6 which further comprises a manual input device in communication with said automatic processor which is adapted to be manually operated to provide said relationship to said automatic processor.

8. The system of claim 1 which further comprises a pump adapted to pump cationic coagulant into the waste water having a non-solid FOG level, to receive said other signal from said automatic processor, and to operate to pump cationic coagulant into the waste water having a non-solid FOG level in response to said other signal.

9. A method of controlling the amount of cationic coagulant to be introduced into a waste water from a laundry which waste water has a non-solid FOG level which is to be reduced, said method comprising:

determining the electric charge value of a material comprising the waste water having a non-solid FOG level and being substantially free of cationic coagulant, said determining occurring upstream of the introduction of said cationic coagulant and upstream of the reduction of the non-solid FOG level;

generating a signal which is indicative of said electric charge value;

providing said signal to an automatic processor;

providing said automatic processor with a relationship of the amount of cationic coagulant to be introduced into said material to reduce the non-solid FOG level of said material to a given level as a function of only said signal;

generating a control signal from said automatic processor, said control signal being based on said automatic processor processing said signal in accordance with said relationship;

providing said control signal to a source of cationic coagulant which provides said cationic coagulant to said material; and operating said source of cationic coagulant in response to said control signal to control the amount of said cationic coagulant from said source of cationic coagulant to said material.

10. The method of claim 9 wherein said material includes substantially no solid phase.

11. The method of claim 9 wherein said material consists of said waste water having a non-solid FOG level.

12. The method of claim 9 which further comprises experimentally developing said relationship.

13. The method of claim 9 wherein said relationship is based on producing a waste water product having a reduced level of non-solid FOG relative to said waste water having a non-solid FOG level which is of reduced quality relative to potable water.

14. The method of claim 9 wherein said relationship is manually imputed to said automatic processor.

\* \* \* \* \*